July 14, 1925.  
C. G. GUIGNARD  
1,545,557  
MACHINE FOR SEVERING COTTON LAPS OR RIBBONS IN PREDETERMINED LENGTHS AND FOR COVERING SAME  
Filed June 6, 1924  
6 Sheets-Sheet 1
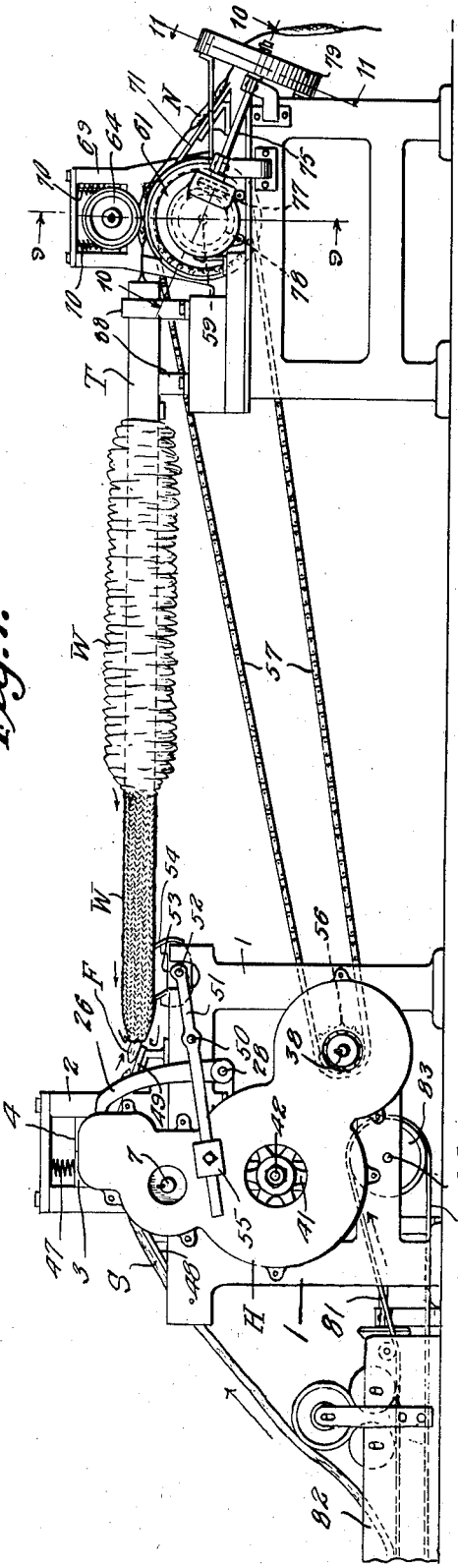
Inventor  
C. G. Guignard  
Attorney

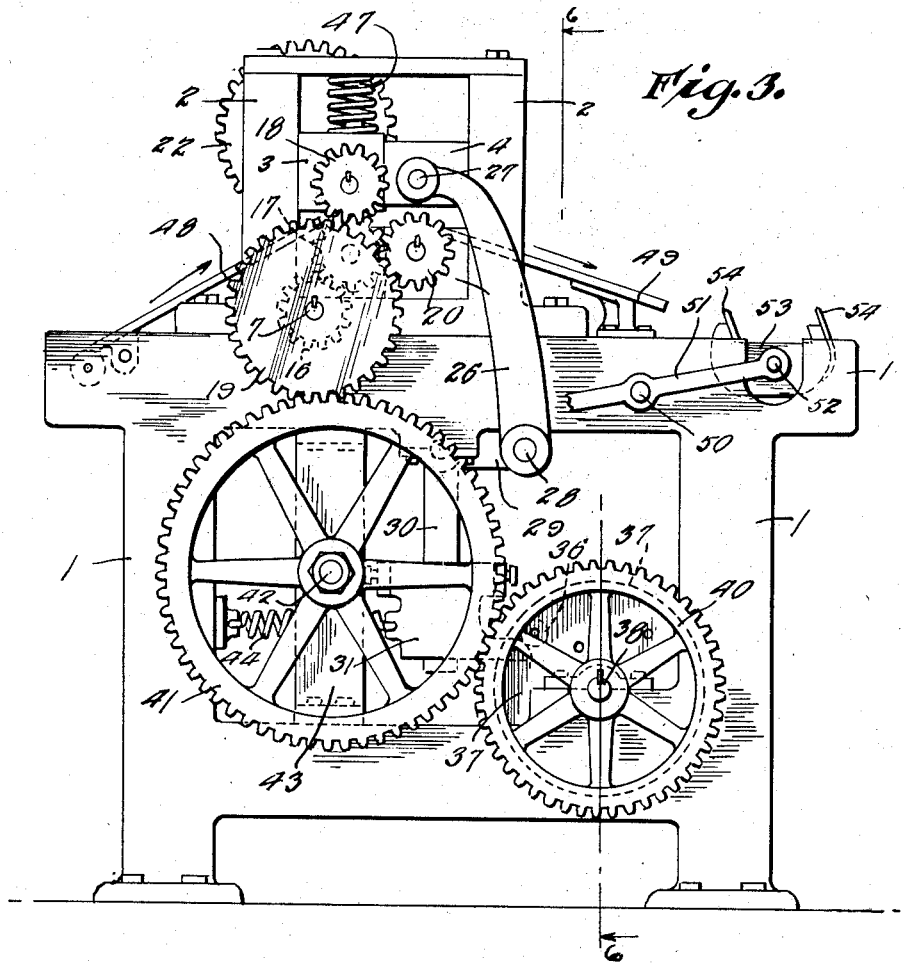

July 14, 1925. 1,545,557
C. G. GUIGNARD
MACHINE FOR SEVERING COTTON LAPS OR RIBBONS IN PREDETERMINED LENGTHS AND
FOR COVERING SAME
Filed June 6, 1924 6 Sheets-Sheet 3

Inventor
C. G. Guignard

By Lester L. Sargent
Attorney

July 14, 1925.                                                          1,545,557
                         C. G. GUIGNARD
MACHINE FOR SEVERING COTTON LAPS OR RIBBONS IN PREDETERMINED LENGTHS AND
                        FOR COVERING SAME
                        Filed June 6, 1924              6 Sheets-Sheet 4

Inventor
C. G. Guignard
By
       Attorney

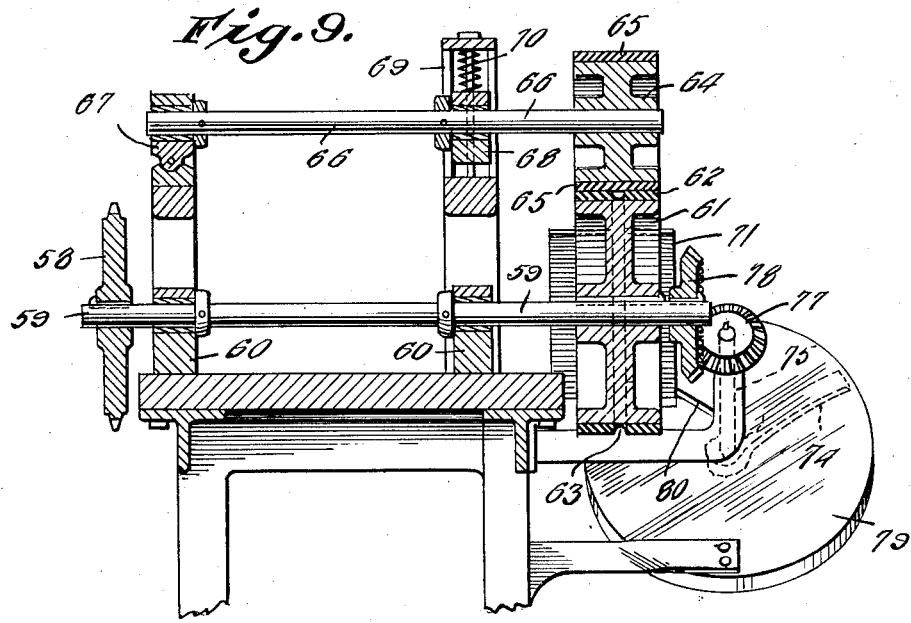

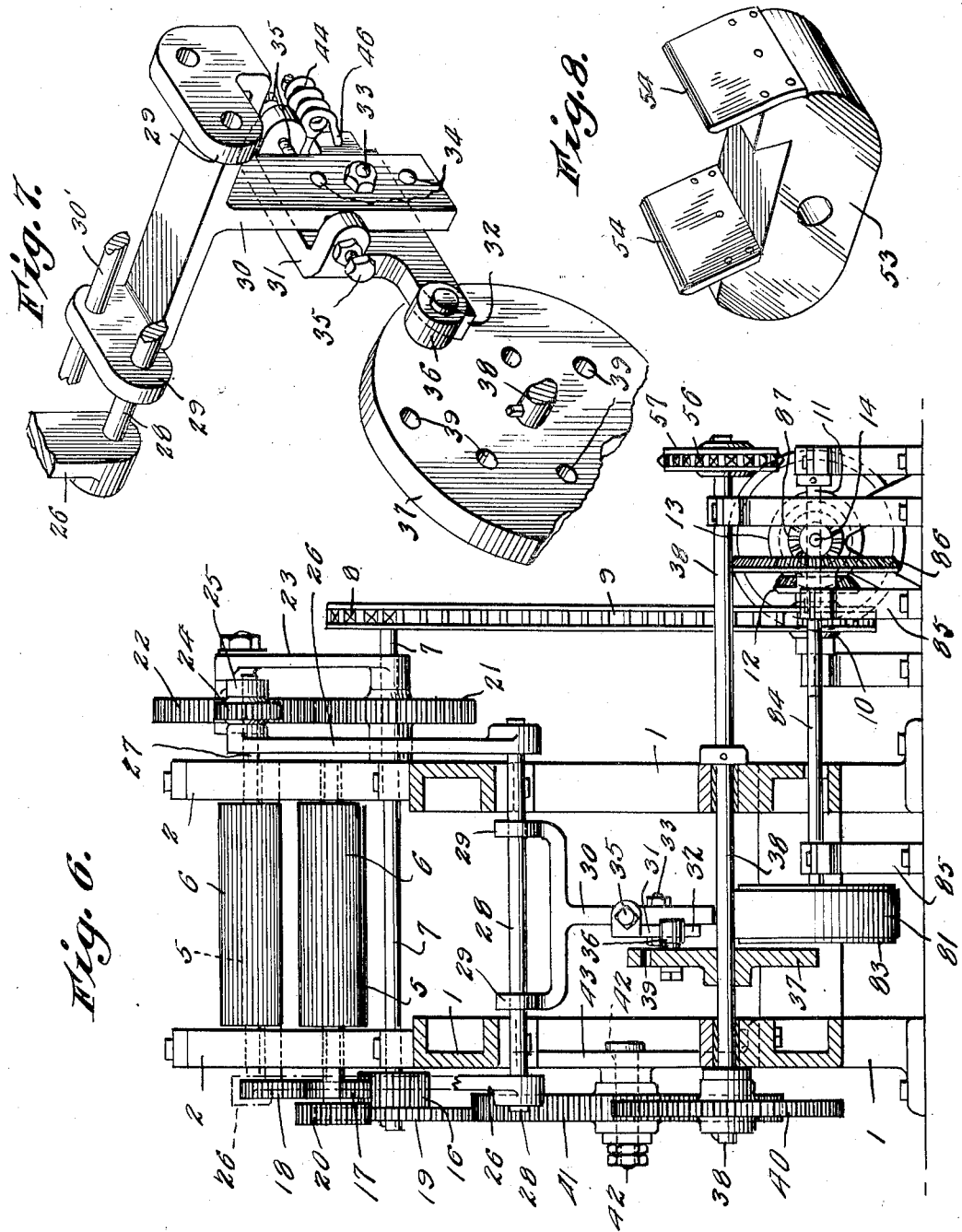

Patented July 14, 1925.

1,545,557

UNITED STATES PATENT OFFICE.

CHRISTOPHER G. GUIGNARD, OF COLUMBIA, SOUTH CAROLINA.

MACHINE FOR SEVERING COTTON LAPS OR RIBBONS IN PREDETERMINED LENGTHS AND FOR COVERING SAME.

Application filed June 6, 1924. Serial No. 718,415.

*To all whom it may concern:*

Be it known that I, CHRISTOPHER G. GUIGNARD, a citizen of the United States, residing at Columbia, in the county of Richland and State of South Carolina, have invented a new and useful Machine for Severing Cotton Laps or Ribbons in Predetermined Lengths and for Covering Same, of which the following is a specification.

The object of my invention is to provide a novel machine for cutting cotton laps in predetermined lengths for use in the manufacture of sanitary napkins or pads, and hospital dressings and for covering these laps with a tubular knitted fabric; and to provide the novel combination and arrangement of parts hereinafter described.

I attain these and other objects of my invention by the mechanism illustrated in the accompanying drawings, in which—

Figure 1 is a side elevation of the entire apparatus;

Fig. 2 is a top plan of same;

Fig. 3 is a side elevation with the protecting cover removed from the gears;

Fig. 6 is a transverse section on line 6—6 of Fig. 3;

Fig. 7 is a detail perspective view of members 37, 36, 31, 44, 30, 29, 28 and 26;

Fig. 8 is a detail perspective view of member 53;

Fig. 9 is a vertical section on line 9—9 of Fig. 1;

Fig. 10 is a section on line 10—10 of Fig. 1;

Fig. 11 is a detail sectional view on line 11—11 of Fig. 1;

Fig. 15 is a detail sectional view of the severing mechanism.

Like numerals indicate like parts in each of the several views.

Figure 5:
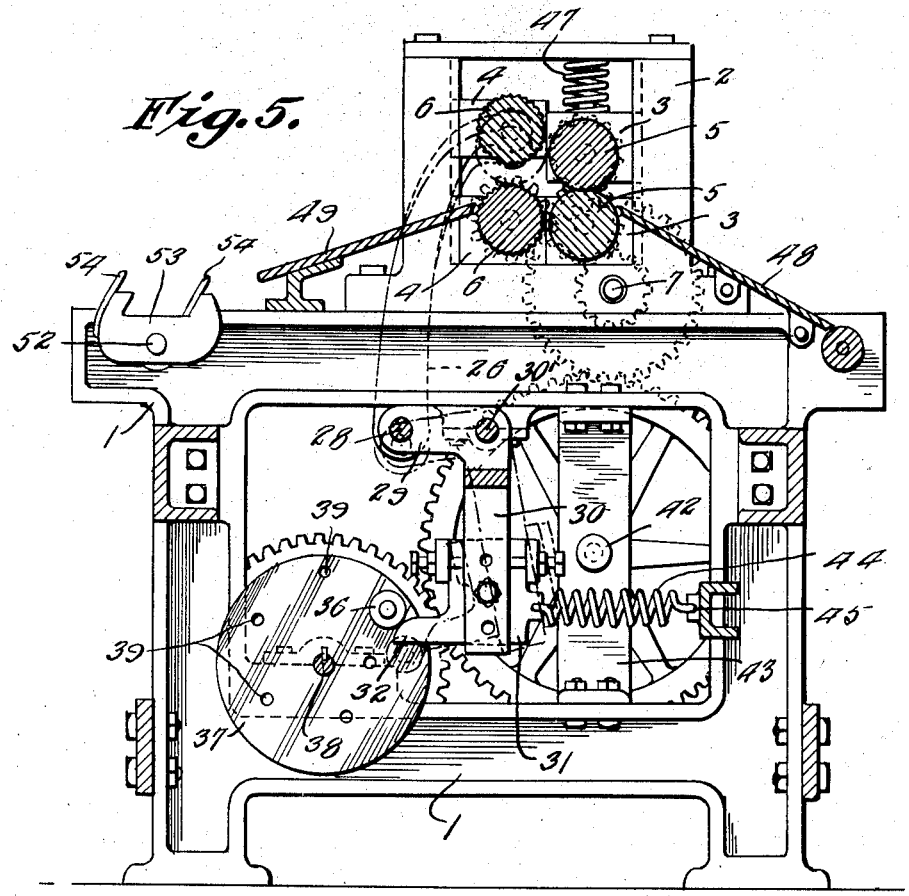
Fig. 5 is a vertical section through the severing machine.
Figures 12, 13:
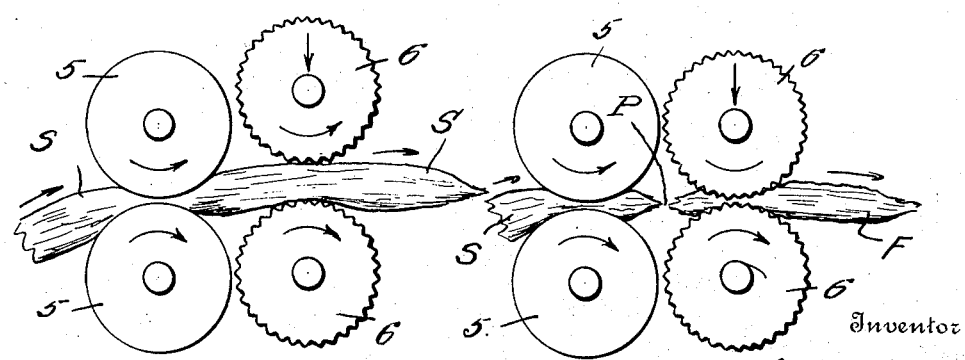
Fig. 12 is a diagrammatic view of the rolls of the severing machine in position prior to the severing operation.
Fig. 13 is a similar view of the rolls during the act of severing cotton laps.

Referring to the accompanying drawings the main frame of the severing machine is designated 1 and mounted on this main frame are standards 2, which support the rollers 5 and 6. The rollers 5 are mounted in bearing blocks 3 and the rollers 6 are mounted in bearing blocks 4. The upper blocks 4 and 3 are vertically slidable, but the blocks 3 are normally held in lowered position by the springs 47. As shown in Figs. 5 and 6, I provide a main drive shaft 7 journaled in frame 2 and carrying a sprocket 8 driven by chain 9 which in turn is driven by sprocket 10 on stub shaft 11, which shaft also carries the gear 12. The gear 12 meshes with a gear 13 on shaft 14 which carries the drive pulleys 15 driven by any suitable source of power. Referring to Fig. 3, the end of shaft 7 opposite to that carrying sprocket 8 carries the pinion 16 which meshes with pinion 17. The latter pinion is mounted on the extended end of the shaft carrying the lower roller 5. Pinion 17 meshes with pinion 18 splined on the extended end of the shaft carrying upper roller 5. Pinions 16, 17, 18 and 20 are of equal size ratio. I provide a gear 19 also carried by shaft 7 which is of a ratio of preferably three to one relative to pinion 16. Gear 19 meshes with gear 20 carried on the end of the shaft carrying the lower roller 6, as best shown in Fig. 6.

Figure 4:
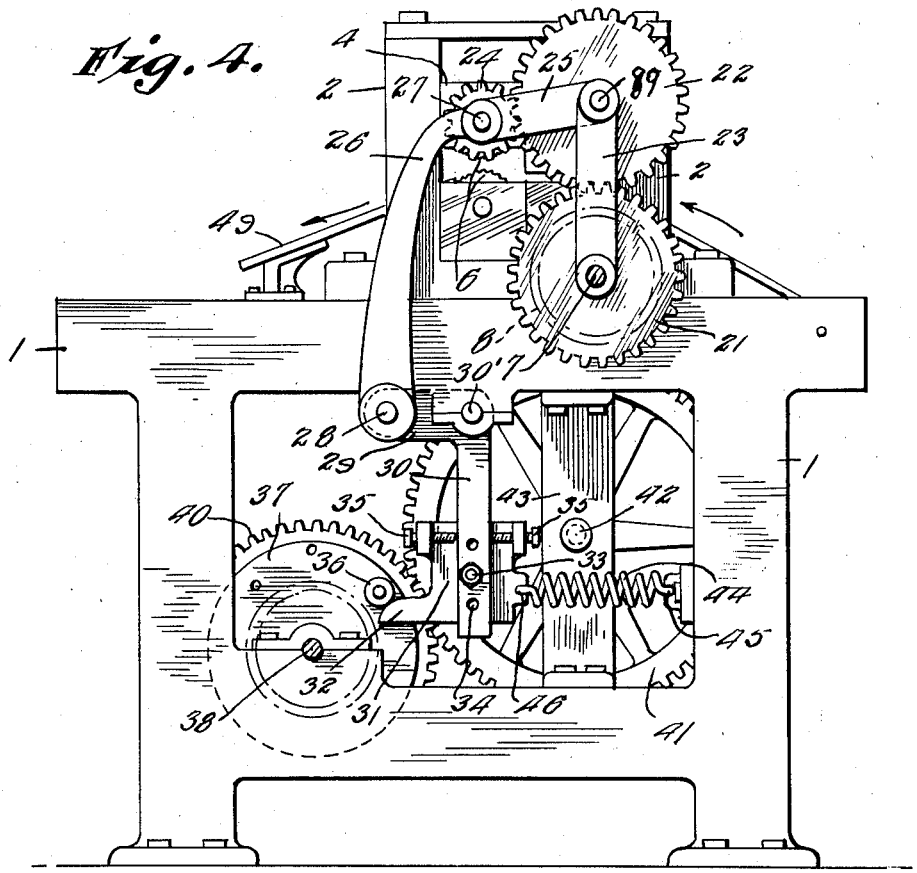
Fig. 4 is a side elevation from the opposite side of said severing machine.

Referring to Fig. 4, I provide on the end of shaft 7 nearest sprocket 8 a gear 21 splined to the shaft. This gear, which is of identical size with gear 19, meshes with gear 22, as shown in Fig. 4. I provide the link 23 extending between shafts 7 and 89 to keep gears 21 and 22 in mesh. I also provide a link 25 extending between shaft 89 and shaft 27 and holding gear 22 and pinion 24 in mesh. I further provide the upwardly extending links 26 on opposite sides of the machine connecting the shaft 27 with the shaft 28 as shown in Figs. 4 and 6. Shaft 28, as shown in Fig. 6, is engaged by the ends 29 of bell crank lever 30, which is swingably mounted on shaft 35, as shown in Figs. 5 and 7.

Referring to Fig. 7, I provide a casting 31 having a protruding cam member 32 adapted to engage the roller 36. Roller 36 is adjustably mounted in disc 37, a plurality of apertures 39 being provided in the disc to permit of such adjustable mounting of roller 36. Disc 37 is mounted on shaft 38.

Referring to Fig. 4, I provide a gear 40 keyed to shaft 38. Gear 40 meshes with the larger idle gear 41. Gear 41 is carried on stub shaft 42 mounted in standard 43.

I provide a spring 44 attached at 46 to casting 31 and attached to frame 1 at 45. Referring to Fig. 2, I provide a guide plate 48 leading to the rollers 5; and a guide plate 49 leading from the rollers 6 to guide the strip of cotton S into and from the respective rollers.

As shown in Fig. 3, I provide a lever 51 mounted by pivot 50 on frame 1. The outer end of lever 51 carries shaft 52, on which is mounted the block 53 which carries the friction fingers 54 adapted to engage the tubular fabric W, as shown in Fig. 1 to cause to feed smoothly through the tube T. Lever 51 carries a weight 55 adjustably mounted on its inner end, as shown in Fig. 1.

As shown in Fig. 2, shaft 38 is provided with a sprocket wheel 56 which drives sprocket chain 57, which in turn drives the sprocket 58 on shaft 59 of the cutting machine. Shaft 59 is mounted in suitable bearing 60, as shown in Fig. 9. On the end of shaft 59 opposite that carrying the sprocket wheel 58 is keyed the roller 61 provided with a suitable friction covering 62 of rubber or leather. This roller is of such diameter that its circumference is equal to twice the length of the lap of cotton, napkin or pad N. Friction covering 62 is provided with a circumferential groove 63 in which the tongue 72 of guide plate 71 rides, as shown in Fig. 10 and Fig. 2. I provide a roller 64 of like width to roller 61 and also provided with a friction covering 65. Shaft 66 is mounted in a hinge bearing 67, as shown in Fig. 9. I provide a vertically slidable bearing 68 in which shaft 66 also is mounted. I also provide standards 69 between which bearing 68 slides, the bearing being engaged by spring 70, as shown in Fig. 9, whereby to hold the roller 64 in resilient frictional engagement with roller 61, as shown in Fig. 9. Guide plate 71 is provided with a knife edge 73 along its outer edge. I also provide a rotary knife 74 which co-acts with the knife edge 73 to shear off the tubular fabric covering, as shown diagrammatically in Fig. 15. Knife 74 is carried on shaft 75 as shown in Fig. 10, and is held in operative engagement with knife edge 73 by spring 76. Shaft 75 carries a gear at its end which meshes with the gear 78 on shaft 59 to cause the knife 74 to follow a continuous rotary course. Gear 78 is preferably of a ratio of two to one relative to gear 77. I provide a suitable cylindrical housing 79 to substantially inclose the rotating knife 74 to prevent accidents to operatives. Housing 79 is provided with a cutaway portion 80 for the passage of the fabric-covered strips of cotton which are to form the napkins N, the fabric covering of which is to be severed at a point between the spaced strips.

Referring to Figs. 1 and 2, I provide a suitable channel 82 through which the cotton strip or ribbon is guided to the first set of rollers 5. The continuous strip or ribbon of cotton S is fed along by means of an endless belt 81 which forms the bottom of the channel 82. Belt 81 travels over a pulley 83 on shaft 84 which is journaled in suitable bearings 85, as shown in Fig. 6. Shaft 84 carries a bevel gear 86 which meshes with pinion 87 on shaft 14, as shown in Fig. 2, and which is connected to the source of power for driving pulley 83 and endless belt 81.

Figure 14:
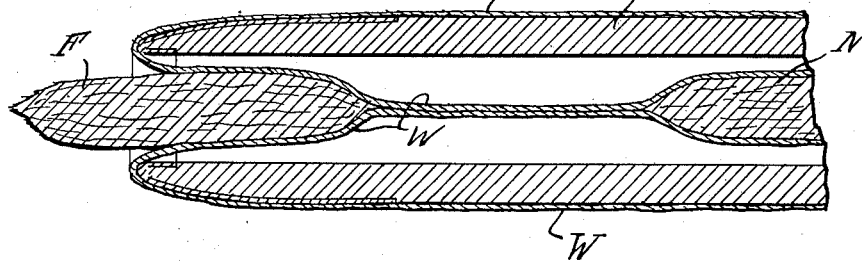
Fig. 14 is an enlarged longitudinal section through tube T showing the feeding of the cotton laps into the tubular fabric W.

I provide suitable guides or supports 88, as shown in Figs. 1 and 2, for releasably holding the end of the wooden tube T on which the tubular fabric W is mounted, and from which it is fed through the tube T in the manner illustrated in Fig. 14. The other end of tube T in which the tubular fabric is fed is supported at the proper height to advantageously receive the short severed strips of cotton F. The inflow of fabric W is regulated by the friction fingers 54 mounted on block 53. The height of this block and of the friction fingers is adjustably regulated by the lever 51 and adjustable weight 55, permitting of delicate adjustment.

In operating the invention, the strip or ribbon of cotton S is fed by the belt 81, which travels in the direction indicated by the arrow. Strip S is fed over platform 48 and between rollers 5, which preferably are smooth rollers; and then through rollers 6, which preferably are corrugated rollers. The upper roller 6 is intermittently raised and lowered. As the rollers 6 are travelling at a higher rate of speed than the rollers 5 they will sever the cotton at a point between the rollers 5 and 6 when the upper roller 6 is brought down into operative engagement with the strip of cotton passing over the lower roller 6. The strip is thus severed into masses of cotton F of predetermined lengths which pass into the open end of tube T which carries the tubular fabric W. Said tubular fabric W is continuously fed from the exterior of tube T over its smooth tapered end as indicated by arrows in Fig. 1 and is also shown in Fig. 14 thus covering the spaced masses of cotton with the tubular fabric W in the manner shown in Fig. 14. The pads or masses of cotton F covered by the tubular fabric W on emerging from tube T pass between the rubber covered rollers 64 and 61 which frictionally engage the product and draw it through the tube T the upper roller 64 being resiliently pressed into operative engagement toward roller 61 by the springs 70, as shown in detail in Fig. 9. The product then flows over platform 71 and past the knife 74 which at regular intervals severs the tubular fabric at the portions between the fabric-covered spaced pads or masses of cotton which form the sanitary napkin N. The knife 74 which is preferably a rotary knife is operatively connected to the shaft that carries the friction wheel 61 and is operated at regular intervals.

The operation of the upper corrugated roller 6 is controlled by the disk 37 which carries the roller 36 which roller engages cam 32 causing the bell crank lever 30 to swing in the manner and direction indicated in dotted lines in Fig. 5 and thus depress arm 26 and also the upper slidable bearing 4 and upper roller 6 to intermittently bring it into contact with the ribbon of cotton that is passing rollers 6. Upper roller 6 is normally held in elevated position by the spring 44 which is attached to casting 31 carrying the cam 32 and normally presses against the casting to hold it in the position shown in heavy lines in Fig. 5. The upper roller 5 is continuously pressed towards the lower roller 5 by the spring 47. The arrangement of gearing shown in Fig. 3 causes the rollers 6 to travel at a higher rate of speed than the rollers 5 in consequence of which they will pull the ribbon of cotton sufficiently to sever it at a point between the rollers 5 and the rollers 6. As this depression of upper roller 6 into operative contact with the strip of cotton occurs at regular intervals controlled by the disk 37 the strip of cotton is severed into masses or pads of a uniform length and this length may be regulated by changing the ratio of the gearing should such change be desired.

As the mechanism for cutting the covered pads N is operatively connected with and driven by sprocket chain 57 from the machine for severing the strip of cotton into predetermined lengths, these two machines operate in synchronism to attain the unitary result of both severing the pads into predetermined lengths and covering them with the tubular fabric and cutting this fabric at regular intervals between the completed napkins N.

What I claim is:

1. In a machine of the class described, a pair of rollers through which a strip of cotton may continuously be fed, means for continuously operating said rollers at a predetermined speed, a second pair of rollers spaced from the first pair of rollers, means for operating said second pair of rollers at a higher rate of speed than the first pair of rollers, and means for intermittently opening apart and closing together the second pair of rollers at pre-determined intervals to sever the strip of cotton at a point between the two pairs of rollers.

2. In a machine of the class described, the combination of a pair of rollers, one of the rollers being slidably mounted and resiliently pressed toward the other roller, a second pair of rollers spaced from the first pair of rollers, the upper roller of said second pair of rollers being slidably mounted, means for moving said upper roller at predetermined intervals into a lowered and operative position relative to the corresponding lower roller, and means for driving the second pair of rollers at a faster rate of speed than the first pair of rollers whereby to sever the strip of cotton into predetermined lengths.

3. In a machine of the class described, the combination of a pair of rollers, one of the rollers being slidably mounted and resiliently pressed toward the other roller, a second pair of rollers spaced from the first pair of rollers, the upper roller of said second pair of rollers being slidably mounted, and means for moving said upper roller at predetermined intervals into a lowered and operative position relative to the lower roller.

4. In a machine of the class described, a pair of rollers through which a strip of cotton may be fed, means for continuously operating said rollers at a predetermined speed, a second pair of rollers spaced from the first pair of rollers, means for operating said second pair of rollers at a higher rate of speed than the first pair of rollers, and means for continuously feeding a strip of cotton to the first pair of rollers.

5. In a machine of the class described, a pair of rollers through which a strip of cotton may be fed, means for operating said rollers at a pre-determined speed, a second pair of rollers spaced from the first pair of rollers, means for operating said second pair of rollers at a higher rate of speed than the first pair of rollers, means for continuously feeding a strip of cotton to the first pair of rollers, means for intermittently bringing the upper roller of the second pair of rollers into contact with the lower roller to effect intermittent severing of the strip of cotton as it is continuously fed through the first pair of rollers, and means for continuously covering the severed strips of cotton with the tubular fabric into which the spaced strips are drawn at intervals.

6. In combination with the apparatus disclosed in claim 5, means for cutting the tubular fabric encasing the aforesaid strips of cotton at uniform intervals between the covered strips of cotton, substantially as shown.

7. In a machine of the class described, the combination of a pair of rollers through which a strip of cotton may be continuously fed, means for operating said rollers at a pre-determined speed, a second pair of rollers spaced from the first pair of rollers, means for continuously operating said second pair of rollers at a higher rate of speed than the first pair of rollers to sever the strip of cotton into predetermined lengths, means for continuously feeding a strip of cotton to the first pair of rollers, means for continuously covering the severed strips of cotton with the tubular fabric into which the spaced strips are drawn at intervals, cutting mechanism to sever the tubular fabric covering the strips of cotton, and means for driving the cutting mechanism in synchronism with and controlled by the machine which severs the cotton into short strips prior to covering it with the tubular fabric.

8. In a machine of the class described, the combination of a pair of rollers through which a strip of cotton may be continuously fed, means for continuously operating said rollers at a predetermined speed, a second pair of rollers spaced apart from the first pair of rollers, means for operating said second pair of rollers at a predetermined and higher rate of speed than the first pair of rollers and means for intermittently bringing the upper roller of the second pair into contact with the lower roller to effect intermittent severing of the strips of cotton being continuously fed through the first pair of rollers and thus to sever the cotton in short strips and at a point between the two pairs of rollers, a tube mounted on the machine and adapted to carry a tubular fabric, said tube having a smooth and tapered end permitting a fragile tubular fabric to be drawn over same without tearing, said end being positioned to receive the strips of cotton at spaced intervals, the tubular fabric being drawn into and through the interior of the tube, and a pair of friction rollers between which the tubular fabric and enclosed strips of cotton are drawn as they emerge from the tube.

9. In combination with the apparatus described in claim 8, means resiliently holding one of the friction rollers in operative relation to the other friction roller.

10. In combination with the apparatus described in claim 8, means resiliently holding one of the friction rollers in operative relation to the other friction roller, and a continuously operating knife arranged to sever the tubular fabric at uniform intervals between the spaced enclosed strips, and means operatively connecting and controlling said knife with the mechanism that controls the two pairs of rollers which sever the cotton into short strips, whereby the entire apparatus will operate in synchronism.

11. In combination with the apparatus described in claim 8, a block carrying friction fingers, said fingers regulating the inflow of the fabric entering the interior of the tube to encase the severed strips of cotton, and an adjustable weighted lever attached to said block for adjusting the height thereof to accomplish required friction to properly regulate flow of the tubular fabric.

CHRISTOPHER G. GUIGNARD.